Aug. 1, 1961  H. A. CLAY  2,994,644
PURIFICATION AND DRYING OF LIQUIDS
Filed March 3, 1958
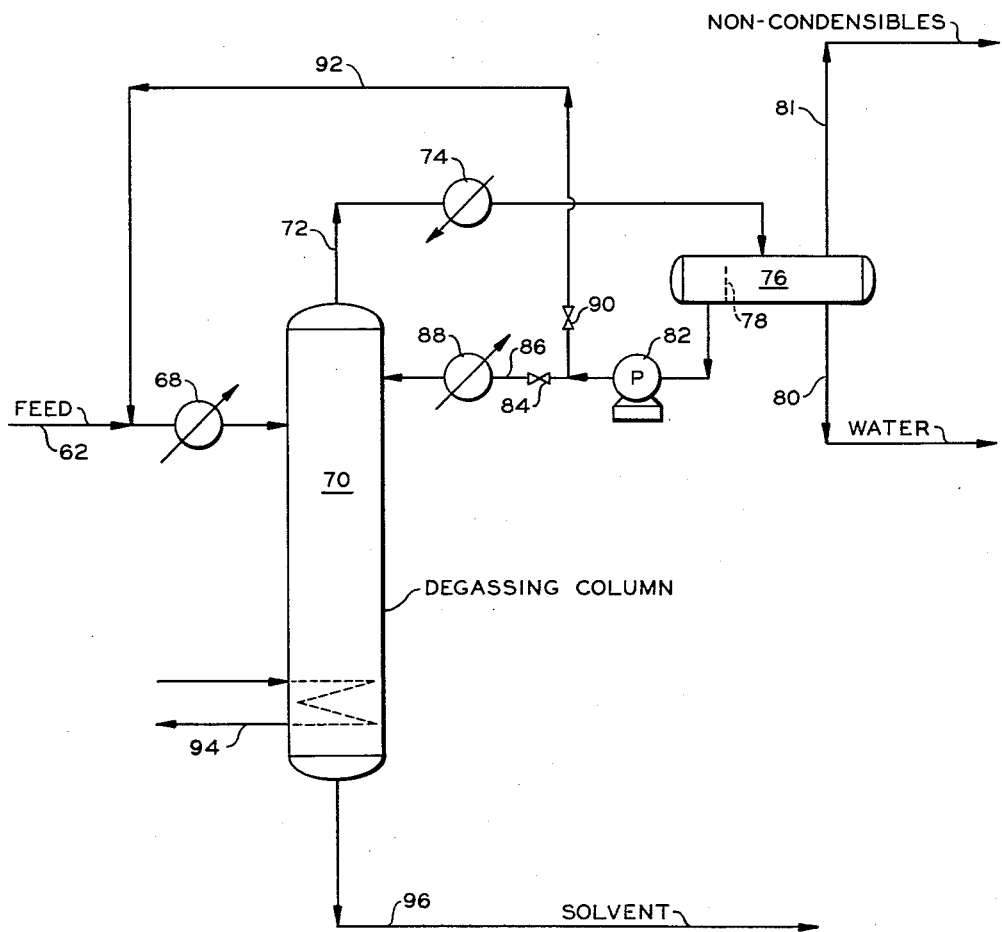
INVENTOR.
H. A. CLAY
BY
*Hudson and Young*
ATTORNEYS United States Patent Office 2,994,644
Patented Aug. 1, 1961

2,994,644
PURIFICATION AND DRYING OF LIQUIDS
Harris A. Clay, Bartlesville, Okla., assignor to Phillips Petroleum Company, a corporation of Delaware
Filed Mar. 3, 1958, Ser. No. 718,588
11 Claims. (Cl. 202—40)

This invention relates to the purification and drying of liquids. In one aspect it relates to the purification and drying of hydrocarbons, such as cyclohexane.

Water free pure liquids find use in many chemical processes as solvents, diluents, absorbents, etc. For example, in the polymerization of olefins to solid polymers it has been found desirable to carry out the polymerization reaction in the presence of a liquid material which is a solvent for the polymer product and which serves as a diluent in the reaction mixture. Usually the solvent or diluent material is employed in very large quantities in comparison with the catalyst and reactants utilized in the polymerization process. For purposes of economy it has been found desirable to recover the solvent from the reaction effluent and, after suitable purification treatment, return the solvent to the polymerization reaction. The purification treatment involves the removal of various extraneous materials which become associated with the solvent during the polymerization reaction and subsequent polymer recovery operations. One of the extraneous materials is water, which has a detrimental effect on the polymerization catalyst and reaction.

It is an object of this invention to provide an improved process for the purification and drying of liquids.

Another object of this invention is to provide an improved process for degassing and drying hydrocarbons.

Still another object of this invention is to provide an improved process for removing low boiling contaminants and water from cyclohexane.

These and other objects of the invention will become more readily apparent from the following detailed description and discussion.

The foregoing objects are achieved broadly by heating a liquid containing entrained water to a temperature at which said water becomes dissolved, introducing the heated liquid into a fractionating column, utilizing at least a portion of the column overhead as reflux, removing free water from said reflux and heating said reflux to a temperature sufficient to dissolve any water entrained therein before returning the reflux to the fractionating column and recovering from said column a purified liquid substantially free of water.

In one aspect of the invention the fractionator liquid feed and reflux are combined, the combined stream is heated to dissolve entrained water and the heated material is then introduced to the fractionating column.

The process of this invention is applicable in general to the treatment of liquids with which water is partially miscible and from which water can be removed by fractionation. The process is particularly applicable to the treatment of hydrocarbons, including paraffins, such as propane, butane, pentane, hexane, etc., olefins, such as propylene, butylene, amylene heptylene, etc., cycloparaffins, such as cyclohexane, cyclopentane, dimethylcyclopentane, etc., aromatics and other hydrocarbons in which water is only partially soluble. These hydrocarbons are frequently employed as diluents or solvents in the polymerization of olefins to solid polymers, utilizing catalysts which are sensitive to water such as organo-metal catalysts, chromium oxide, containing hexavalent chromium, and other catalysts. The following discussion is directed to the purification of hydrocarbon solvents employed in the polymerization of olefins to solid polymers, and in particular to the purification of cyclohexane. This is not intended, however, in any limiting sense and it is within the scope of the invention to purify and dry liquids in general as hereinbefore set forth.

In carrying out the invention in one embodiment thereof, a hydrocarbon solvent, recovered from the reaction effluent from the polymerization of ethylene in the presence of chromium oxide catalyst, containing lower boiling hydrocarbons and dissolved and entrained water, is heated to a temperature at which the entrained water passes into solution and is then introduced to a fractionating column. Within this column, which can be of any conventional design, such as a bubble tray column, a perforated tray column, a packed column, etc., additional heat is introduced to the liquid whereby vaporization of lower boiling hydrocarbons and water takes place. The vaporized material, which includes a portion of the hydrocarbon solvent, is withdrawn overhead from the fractionating column and cooled to a sufficient temperature to condense the water and solvent. The mixture of condensed liquid and vapors is introduced to a settling zone from which the lower boiling hydrocarbons are vented. The condensed material is retained in this zone for a sufficient period of time to allow separation into a water phase and a solvent phase. The water phase is discarded and the solvent is withdrawn from the separator, heated to a sufficient temperature to dissolve any entrained water and then returned to the fractionating column as reflux. Alternatively, the reflux can be heated separately before it is returned to the fractionating column or it can be combined with the liquid feed and the combined stream can be heated and introduced to the fractionating column. The bottoms from the fractionating column comprise the purified liquid which is substantially freed from water and low boiling hydrocarbons.

The fractionating column is operated at a sufficient temperature to effect vaporization therein of substantally all of the water and lower boiling hydrocarbons. The temperatures and also the pressures employed can vary over a wide range depending upon the particular liquid which is being purified. In general the pressure is maintained only at a sufficient level to assure retention of the material to be purified in the liquid state. When purifying cyclohexane, the operation is usually carried out in a temperature range of between about 180 and about 210° F., and at a pressure of between about 4.0 and 10.0 p.s.i.g. The temperature to which the liquid feed and recycle are heated can also vary substantially depending on the amount of free water present in these streams. Cyclohexane, depending on its temperature, can contain from 50 to as high as 1000 to 2000 parts per million of dissolved water. In addition, this material can contain an equal or greater quantity of entrained water.

The method of this invention provides a number of advantages. It has been found for example, that if the liquid feed and reflux are introduced to a fractionating column containing entrained water, the water is not evaporated to any great extent until these streams have passed far enough down into the column for the water to become dissolved in the liquid. Thus the water concentration of the vapor in the column remains nearly constant down to the point in the column where free water no longer exists. Below that point the water concentration begins to fall as dissolved water is removed. By heating the feed and reflux streams before their introduction to the column to eliminate free water, the portion of the column required for dissolution of the water is in effect eliminated and the entire column is then available for fractionation and removal of dissolved water. This permits a greater capacity in a column of given size or a reduction in column size with the same capacity. As a further advantage of the invention, the introduction of streams free of undissolved water greatly reduces condensation of water in the fractionating column and substantially reduces corrosion.

In order to more clearly describe the invention and to provide a beter understanding thereof, reference is made to the accompanying drawing which is a diagrammatic illustration of fractionating equipment suitable for the purification and drying of solvent recovered from a polymerization unit.

Referring to the drawing a feed material, comprising a mixture of cyclohexane, low boiling hydrocarbons and dissolved and entrained water, recovered from an olefin polymerization effluent, is passed through conduit 62 and heater 68 into degassing column 70. Before entering heater 68 this material is joined by reflux to the degassing column through conduit 92. In heater 68 the combined feed and reflux material is increased in temperature sufficiently to assure dissolution of any entrained water, such that the material entering the degassing column contains only dissolved water. Within the degassing column the feed material is further elevated in temperature by a conventional reboiler 94 to the point where the dissolved water and low boiling hydrocarbons are vaporized. These materials along with a portion of the cyclohexane, pass overhead from the degassing column through conduit 72, condenser 74 and into an accumulator 76. The temperature of the condenser is maintained at a level sufficient to condense cyclohexane and water but not the low boiling hydrocarbons. These materials, which remain in the gaseous state are vented from the accumulator 76 through conduit 81. Again, in this accumulator, the condensed portion of the overhead separates into two phases, with the heavier water phase being withdrawn therefrom through conduit 80. The hydrocarbon phase which comprises cyclohexane containing dissolved and entrained water overflows baffle 78 and is withdrawn from the accumulator through pump 82. This material can be combined with the feed to the degassing column through valve 90 and conduit 92, as previously described, or in the alternative, can be passed through valve 84, conduit 86 and heater 88, and introduced to the degassing column as a separate stream. Usually when condensables lighter than a solvent are present it is desirable to return the reflux as a separate stream and preferably several trays above the feed tray so as to provide a rectifying section in the tower, and thus assure more effective removal of these materials. The product from the degassing column, which is removed from the bottom thereof through conduit 96, is cyclohexane which is essentially free from water, containing usually not more than one part per million of dissolved water.

The preceding discussion has been directed to a specific embodiment of the invention, however, this is not intended in any limiting sense and it is within the scope of the invention to utilize other process arrangements which can effect the purpose of the invention. Thus, if there are no condensable light impurities in the solvent entering the degassing column, the column feed can be introduced to accumulator 76, along with the overhead from the degassing column. In this manner a separation of water by decantation is effected before the feed enters the column. The feed to the degassing column will usually be liquid, however, this material can also be partially in the vapor state. If so, it is necessary that the temperature and pressure be adjusted so as to allow no separate liquid-water phase in the feed. If the feed is a vapor, or is at a somewhat higher temperature than the material leaving condenser 74, it may be desirable to pass all or a portion of the feed through this condenser before introducing it to accumulator 76. If the feed is sub-cooled it can be used to effect a partial or complete condensation of overhead vapor by direct mixing and thus eliminate or reduce the size of condenser 74. As an aid in heat economy, it is within the scope of the invention to employ a bottom product from the degassing column to supply heat by indirect heat exchange to the feed and/or column reflux.

The following data are presented in illustration of the specific embodiment of the invention hereinbefore described in connection with the drawing. These data compare a commercial operation before and after preheating of the feed and reflux to the degassing column was practiced.

*Example*

|  | Without Feed and Reflux Preheat | With Feed and Reflux Preheat |
| --- | --- | --- |
| Flow Rates, g.p.m.: | | |
| Feed | 320 | 320 |
| Reflux | 55 | 55 |
| Bottoms Product | 320 | 320 |
| Water Content, p.p.m.: | | |
| Feed (Free Water) | 100–500 | 0 |
| Reflux (Free Water) | 100–500 | 0 |
| Bottoms Product (Dissolved Water) | 10–30 | ¹ 0–10 |
| Temperatures, °F.: | | |
| Feed | 100 | 121 |
| Column— | | |
| Top | 183 | 183 |
| Bottom | 203 | 203 |
| O.H. Accumulator | 103 | 103 |
| Reflux | 103 | 121 |
| Pressures, p.s.i.g.: | | |
| Column Bottom | 4.5 | 4.5 |
| O.H. Accumulator | 3.5 | 3.5 |

¹ Within accuracy of analytical instruments.

Having thus described the invention by providing a specific example thereof it is to be understood that no undue limitations or restrictions are to be drawn by reason thereof and that many variations and modifications are within the scope of the invention.

I claim:

1. A process for the purification of a liquid containing dissolved water in an amount proportional to the temperature of said liquid and entrained water which comprises heating said liquid to a temperature sufficient to dissolve the entrained water, introducing the heated liquid to a fractionation zone, removing from the upper portion of said zone a vapor stream concentrated in water, condensing said stream, separating from the condensate undissolved water, heating at least a portion of the condensate to a temperature sufficient to dissolve entrained water, returning the heated condensate to said zone as reflux and recovering from said zone a liquid substantially free of water.

2. The process of claim 1 in which the liquid is a hydrocarbon.

3. The process of claim 2 in which the condensate is combined with the hydrocarbon containing dissolved and entrained water, the combined stream is heated to dissolve entrained water and said stream is then introduced to the fractionation zone.

4. The process of claim 2 in which the hydrocarbon feed and condensate are separately heated before entering the fractionation zone.

5. The process of claim 3 in which the hydrocarbon is cyclohexane.

6. The process of claim 4 in which the hydrocarbon is cyclohexane.

7. A process for the purification of a hydrocarbon mixture containing hydrocarbon A, lower boiling hydrocarbons B and dissolved water in an amount proportional to the temperature of said liquid and entrained water which comprises heating said hydrocarbon mixture to a temperature sufficient to dissolve the entrained water, introducing the heated hydrocarbons to a fractionation zone, removing from said zone an overhead vapor stream concentrated in water and lower boiling hydrocarbons B, condensing from said stream hydrocarbon A and water, separating from the condensate uncondensed low boiling hydrocarbons B and undissolved water, heating at least a portion of the condensate to a temperature sufficient to dissolve entrained water, returning the heated condensate to said zone as reflux and recovering from said zone hydrocarbon A substantially free of water.

8. The process of claim 7 in which the condensate is combined with the hydrocarbon mixture, the combined stream is heated to dissolve entrained water and said stream is then introduced to the fractionation zone.

9. The process of claim 7 in which the hydrocarbon mixture and condensate are separately heated before entering the fractionation zone.

10. The process of claim 8 in which hydrocarbon A is cyclohexane.

11. The process of claim 9 in which hydrocarbon A is cyclohexane.

References Cited in the file of this patent

UNITED STATES PATENTS

| | | |
|---|---|---|
| 2,322,881 | Pollock | June 29, 1943 |
| 2,366,899 | Hall et al. | Jan. 9, 1945 |
| 2,368,497 | Shipley et al. | Jan. 30, 1945 |
| 2,463,188 | Latchum | Mar. 1, 1949 |
| 2,485,329 | Steele et al. | Oct. 18, 1949 |
| 2,600,182 | Arnold et al. | June 10, 1952 |
| 2,667,451 | Larson | Jan. 26, 1954 |